(12) United States Patent
Robinson et al.

(10) Patent No.: US 11,905,359 B2
(45) Date of Patent: *Feb. 20, 2024

(54) POLYURETHANE ELASTOMERS, BIO-ADDITIVE COMPOSITIONS

(71) Applicant: Evoco Ltd., Toronto (CA)

(72) Inventors: Jason James Robinson, Toronto (CA); Mustafa Abu Ghalia, Toronto (CA); Syed Muhammad Husainie, Etobicoke (CA)

(73) Assignee: Evoco Limited, Toronto (CA)

( * ) Notice: Subject to any disclaimer, the term of this patent is extended or adjusted under 35 U.S.C. 154(b) by 540 days.

This patent is subject to a terminal disclaimer.

(21) Appl. No.: 17/107,381

(22) Filed: Nov. 30, 2020

(65) Prior Publication Data

US 2022/0073674 A1    Mar. 10, 2022

Related U.S. Application Data

(63) Continuation-in-part of application No. 17/015,808, filed on Sep. 9, 2020, now Pat. No. 10,934,385.

(51) Int. Cl.
| | |
|---|---|
| *C08G 18/78* | (2006.01) |
| *C08G 18/64* | (2006.01) |
| *C08J 9/12* | (2006.01) |
| *C08L 75/06* | (2006.01) |
| *C08K 3/26* | (2006.01) |

(52) U.S. Cl.
CPC ......... *C08G 18/7887* (2013.01); *C08G 18/64* (2013.01); *C08J 9/125* (2013.01); *C08K 3/26* (2013.01); *C08L 75/06* (2013.01); *C08J 2203/10* (2013.01); *C08J 2375/06* (2013.01); *C08K 2003/265* (2013.01)

(58) Field of Classification Search
CPC .............................. C08G 18/4238; C08L 75/06
See application file for complete search history.

(56) References Cited

U.S. PATENT DOCUMENTS

| | | | |
|---|---|---|---|
| 9,085,677 B2 | 7/2015 | Budina | |
| 10,934,384 B1 * | 3/2021 | Robinson | ........... C08G 18/7671 |
| 10,934,385 B1 * | 3/2021 | Robinson | ........... C08G 18/4202 |
| 2010/0112333 A1 * | 5/2010 | Cameron | ............... C08G 18/10 |
| | | | 36/25 R |
| 2010/0239803 A1 * | 9/2010 | Farkas | .................... B29C 48/04 |
| | | | 528/84 |
| 2013/0210950 A1 * | 8/2013 | Nefzger | ..................... C08J 9/04 |
| | | | 521/170 |
| 2014/0323616 A1 * | 10/2014 | Liu | ........................ C08L 33/10 |
| | | | 524/21 |

FOREIGN PATENT DOCUMENTS

| | | | | |
|---|---|---|---|---|
| CN | 102775759 A | * | 11/2012 | |
| JP | 06248104 A | * | 9/1994 | ......... B29C 45/0001 |
| JP | 2006182874 A | * | 7/2006 | |
| JP | 2016069658 A | * | 5/2016 | |
| WO | WO-2011145461 A1 | * | 11/2011 | ............ C08J 9/0061 |

OTHER PUBLICATIONS

Machine Translation of WO2011145461 A1. Nov. 24, 2011. (Year: 2011).*
Machine Translation of JP2016069658A. May 9, 2016. (Year: 2016).*
Machine Translation of JPH06-248104A. Sep. 6, 1994. (Year: 1994).*
Foam Specifications Explained. Ultralon Products (NZ) Ltd. Retrieved Oct. 27, 2020. (Year: 2020).*
Machine Translation of CN102775759A. Nov. 14, 2012. (Year: 2012).*
Szycher, M. Szycher's Handbook of Polyurethanes: Second Edition. CRC Press, Taylor & Francis Group, LLC. 2013. pp. 547-585. (Year: 2013).*
Machine Translation of JP2006-182874A. Jul. 13, 2006. (Year: 2006).*
International Search Report and Written Opinion issued in respect of PCT/CA2021/051661, dated Jan. 31, 2022.

* cited by examiner

Primary Examiner — Stephen E Rieth

(57) ABSTRACT

A polyurethane elastomer, which can be a foam, generated from (a) an organic diisocyanate, (b) a polyester resin, (c) a chain extender comprised of a polyhydric alcohol, (d) a crosslinker, (e) a plasticizer, (f) a surfactant, (g) a bio-additive, (h) a blowing agent, and (i) an optional dye; and optionally where the elastomer has, for example, a hardness value of, for example, from about 15 Asker C to about 60 Asker C, a tensile strength of from about 1 MPa to about 10 MPa, a resilience of from about 30 percent to about 60 percent, an elongation at break of from about 150 percent to about 700 percent, and a tear strength from about 2 Newtons/millimeters to about 4 Newtons/millimeters, and which elastomers can be selected for footwear.

22 Claims, No Drawings

POLYURETHANE ELASTOMERS, BIO-ADDITIVE COMPOSITIONS

This disclosure is generally directed to polyurethane elastomers generated from (a) an organic diisocyanate, (b) a polyester resin, (c) a chain extender, (d) a crosslinker, (e) a plasticizer, (f) a surfactant, (g) a bio-additive, (h) an optional blowing or foaming agent, and (i) an optional colorant; and which elastomers can be selected for a number of articles, such as footwear, insoles, midsoles, shoes, boots, sneakers, slippers, clothing, insulation, automobile components, furniture components like coverings, bedding, seals, molded flexible parts, adhesives, automobiles, medical devices, and as a replacement for known polyurethane elastomers.

CONTINUATION-IN-PART

The present application, Evoco Ltd., United States Patent Application No. (not yet assigned), is a Continuation-In-Part application of Evoco Ltd. U.S. patent application Ser. No. 17/015,808, electronically filed with the United States Patent Office on Sep. 9, 2020, the entire disclosure of this application Ser. No. 17/015,808 is totally incorporated herein by reference. Also, the filing date/priority date of Sep. 9, 2020 for the copending application Ser. No. 17/015,808 is hereby claimed for the common subject matter contained in the present Continuation-In-Part application.

RELATED APPLICATIONS

In copending patent application, U.S. application Ser. No. 17/015,669, electronically filed with the United States Patent Office on Sep. 9, 2020, there are illustrated polyurethane elastomers, foam compositions, and processes thereof, the disclosure of this copending application being totally incorporated herein by reference, especially as applicable to examples of the components and all the Lab Examples.

In copending U.S. patent application Ser. No. 17/015,808, electronically filed with the United States Patent Office on Sep. 9, 2020, there are illustrated biocide containing polyurethane elastomers, foam compositions, and processes thereof, the disclosure of this copending application being totally incorporated herein by reference, especially as applicable to the Lab Examples, and examples of components.

BACKGROUND

Illustrated in U.S. Pat. No. 9,085,677 are bioplastic compositions containing an oligosaccharide, a saccharide polymer, a plasticizer, and an additive, wherein the additive is powdered clamshell, powdered eggshell, powdered coconut shell, gelatin, sawdust, and mixtures thereof.

There is disclosed in PCT WO2013/075003A1, a process for obtaining eggshell powders that can be selected for certain polymer composites, such as certain thermoplastic polymers, and certain thermoset polymers like polyethylene, by pulverizing the eggshells at high speeds and low temperature; wherein the eggshell component possesses a lipid-protein structure substantially similar to that of the eggshell from which the eggshell component is derived, and wherein the eggshell component is substantially free of eggshell inner membrane material.

In U.S. Patent Publication 2016/0168311, there is disclosed a polyurethane composition produced by admixing a polysaccharide, a surfactant, and a natural oil polyol in a solvent to produce a first admixture; and reacting the first admixture with a polyisocyanate.

In U.S. Patent Publication 2009/0035342, there is disclosed an antimicrobial composition of silver, zinc, or a copper compound, and suspensions of, for example, lotions and creams.

In U.S. Pat. No. 7,777,091, there is described a method for preparing polyurethanes foam dressing materials with improved moisturization by the use of polysaccharides to accelerate wound healing.

U.S. Patent Publication 2013/0324626 A1 discloses the formation of rigid polyurethane foams with polyether ester polyols based on fatty acids or fatty acid derivatives derived from hazelnut oils and other oils.

Further, disclosed in U.S. Patent Publication 2012/0123005 is a polyurethane foam formed from the reaction product of at least one isocyanate, and at least one natural oil based polyol, wherein the at least one isocyanate and the at least one natural oil based polyol are reacted in the presence of at least one polyalkylene oxide polysiloxane having a specific formula.

In U.S. Patent Publication 2012/0258269, there is disclosed a process for preparing polyester polyols from at least one carboxylic acid recovered from natural raw materials and having at least two acid groups, at least one polyhydric alcohol, at least one organic phosphite group, and at least one Lewis acid.

Certain polyurethane flexible foams (PU) are known for their uses as footwear, automotive applications, Yoga mats, mattresses, and the like. However, conventional petrochemical based materials being used to manufacture polyurethane (PU) flexible foams have a negative impact on the environment. Thus, the increase in environmental consciousness has necessitated an increased demand for "greener" materials, that could be partially addressed by using renewable materials in the production of PU foams. While increasing the renewable content, it is desired to maintain or improve the performance properties of the foam. When introducing certain bio-based additives to a number of known formulations, there is a reduction in mechanical properties as these additives disrupt the foam network responsible for the mechanical strength. For example, in the footwear industry, mechanical strength properties, such as tensile strength, ultimate elongation, tear strength, and resilience, can be important to a foam's performance.

Athletic shoes, whether for running or engaging in sports activities, lose massive amounts of energy due to impact and shock, especially in the midsoles. A well cushioned shoe disperses the impact and shock that, for a period of time, keeps the feet comfortable and prevents the feet from hurting. High performance athletic shoes have well cushioned midsoles that transfers the impact into forward motion or lift-offspring-like effect, as if the impact/shock is being turned into a return energy.

A number of polyurethane elastomers are known, many of which possess deficiencies, such as insufficient life times, poor hardness, degradation, unsuitable, and consistent properties like tensile strengths, discoloration, lack of continued suitable flexibilities, complex and costly preparation processes including the absence of components, such as phosphites, and the absence of polyesters like the disclosed amorphous polyester resins and semi-crystalline polyester resins in combination with other components, and which elastomers are free of bio-additives.

Therefore, there is a need for compositions and processes enabling flexible polyurethane elastomers and foams thereof with improved characteristics, and that are suitable for footwear insoles or midsoles and with, for example, specific mechanical properties, such as a hardness of the polyurethane foams of, for example, from about 15 to about 60 Asker C, and more specifically, for insoles a hardness of, for example, from about 22 to about 44 Asker C, and for midsoles a hardness of, for example, from about 40 to about 60 Asker C, and with, for example, an amorphous polyester or a semi-crystalline polyester with excellent melting points.

Also, there is a need for compositions and processes for flexible polyurethane elastomer foams with improved characteristics, and that include as a component a polyol polyester, an amorphous polyester, or a semi-crystalline polyester with an excellent melting point.

Yet also, there is a need for polyurethane elastomers and processes wherein there are selected surfactants, plasticizers, dyes, crosslinkers, chain extenders, and at least one bio-additive.

Further, there is a need for polyurethane (PU foams) that has an excellent density, prolonged Asker C hardness, improved tensile strengths, acceptable and consistent elongation, and tear strength properties, and which foams are, for example, selected for shoes and similar footwear that contain insoles and midsoles.

Another need resides in the generation of polyurethane elastomers where there is eliminated a number of semi-crystalline polyester polyols that are heated above certain temperatures prior to permitting the initiation of foaming, and which polyols increase preheating time, create a highly viscous liquid with difficulty to use in manufacturing methods, and where elevated temperatures increase the reaction kinetics, and cause less control over the reaction thereby adversely affecting product quality.

Additionally, there is a need for where plasticizers to lower the viscosities of a polyol, which negatively affects the mechanical properties of the final foam materials, is avoided.

There is a need for footwear like athletic shoes with superior energy return, that is the ability of footwear, such as athletic shoes, to receive and release energy upon impact on striking the ground versus resilience, which is the ability to spring back into its original shape (elasticity) after being compressed and measured by the rebound percentage.

Moreover, there is a specific need for athletic shoes and for cushioned shoes that disperse the impact and shock that permits very comfortable feet and prevents or minimizes feet hurting by transferring the impact into forward motion or to a lift-offspring-like effect, that is the impact/shock is converted into a return energy versus losing massive amounts of energy due to impact and shock, especially in the midsoles.

There is a need for athletic shoes with superior energy return, that is the ability of footwear, such as athletic shoes, to receive and release energy upon impact on striking the ground versus resilience, which is the ability to spring back into its original shape (elasticity) after being compressed and measured by the rebound percentage. Athletic shoes, whether for running or engaging in sports activities, lose massive amounts of energy due to impact and shock, especially in the midsoles. A well cushioned shoe disperses the impact and shock that keeps the feet comfortable and prevents the feet from hurting. High performance athletic shoes have well cushioned midsoles that transfer the impact into forward motion or lift-offspring-like effect, as if the impact/shock is being turned into a return energy. The disclosed polyurethane foam-based midsoles have a number of desired characteristics, such as for example, a return energy of from about 50 percent to about 100 percent, from about 55 to about 75 percent, and from about 55 to about 65 percent as measured by VF Corporation with their proprietary equipment, hydrolytic stability, excellent resilience of, for example, from about 25 percent to about 60 percent, from about 30 percent to about 60 percent, from about 25 percent to about 45 percent, and improved compression sets.

Yet further, there is a need for including certain bio-based additives in polyurethane elastomers and foams thereof that maintain and improve the performance of the foams, and where adding additional amounts of additives will not adversely affect the foam properties.

Another need resides in generating polyurethane flexible foams that include bio-based additives for enhancing or modifying the mechanical properties of the foams while simultaneously increasing the bio-content thereof.

Further, there is a need for polyurethane elastomers selected for insoles and midsoles with excellent mechanical properties, and where the insoles have in embodiments a density (gram/centimeters$^3$) of, for example, from about 0.2 to about 0.3; a hardness (Asker C) of, for example, from about 15 to about 45; an elongation of from about 450 percent to about 650 percent; a tensile strength of greater than about 20 MPa; a tear strength of greater than about 2 (Newtons/millimeters); a rebound test resilience of from about 40 to about 55 percent; a compression set of less than about 6 percent; and a hydrolytic stability of equal to at least 80 percent; and for midsoles a density in gram/centimeter$^3$ of less than about 0.5; a hardness (Asker C) of from about 30 to about 50; an elongation of greater than about 300 percent; a tensile strength in MPa of greater than about 10; a tear strength in Newtons/millimeters of greater than about 3; a rebound test resilience of greater than about 60; a compression set of less than about 20 percent; an abrasion of less than about 300 percent; and a hydrolytic stability of at least 80 percent.

An important need resides in providing polyurethane elastomer foams with a bio-content of, for example, from about 60 percent to about 90 percent, from about 40 percent to 85 percent, from about 70 percent to about 85 percent, and from about 60 percent to about 80 percent.

These and other needs can be achievable with the bio-additive containing polyurethanes and foams of the present disclosure.

SUMMARY

There is disclosed herein polyurethane elastomers which in embodiments are comprised of a bio-additive selected from the group consisting of chitin, chitosan, cellulose, Nutmeg, eggshells, hazelnut shells, walnut shells, peanut shells, Brazilian nutshells, pecan shells, cashew nutshells, almond shells, chestnut shells, macadamia nutshells, pistachio nutshells, pine nutshells, and mixtures thereof.

Also, disclosed are polyurethane elastomers which in embodiments are comprised of a bio-additive selected from the group consisting of chitin, chitosan, cellulose, Nutmeg, eggshell, hazelnut shell, walnut shell, peanut shell, Brazilian nutshell, pecan shell, cashew nutshell, almond shell, chestnut shell, macadamia nutshell, pistachio nutshell, pine nutshell, and mixtures thereof.

Additionally there is disclosed polyurethane elastomer compositions comprising (a) an organic diisocyanate, (b) a polyester resin, (c) a chain extender, (d) a crosslinker, (e) a plasticizer, (f) a surfactant, (g) a foaming agent, (h) a bio-additive selected from the group consisting of chitin, chitosan, Nutmeg, cellulose, eggshell, hazelnut shell, walnut shell, peanut shell, Brazilian nutshell, pecan shell, cashew nutshell, almond shell, chestnut shell, macadamia nutshell, pistachio nutshell, pine nutshell, inclusive of shells thereof and mixtures thereof, (i) an optional colorant; and wherein said elastomer has a hardness value of from about 15 Asker C to about 60 Asker C, a tensile strength of from about 1 MPa to about 10 MPa, a resilience of from about 25 percent to about 60 percent, an elongation at break of from about 150 percent to 700 percent, and a tear strength of from about 2 Newtons/millimeters to about 4 Newtons/millimeters.

Further, disclosed herein are polyurethane elastomer compositions, which in embodiments are comprised of and can be generated from the mixing and reacting of (a) an organic diisocyanate, (b) a polyester resin, (c) a chain extender comprised of a polyhydric alcohol, (d) a crosslinker, (e) a plasticizer, (f) a surfactant, (g) a bio-additive, (h) a foaming agent, and (i) an optional colorant, such as a dye; and wherein the elastomers and foams thereof have, for example, a hardness value of from about 15 or 20 Asker C to about 60 Asker C, a tensile strength of, for example, from about 1 MPa to about 10 MPa, a resilience of, for example, from about 25 percent to about 60 percent, and an elongation at break of, for example, from about 150 percent to about 700 percent, and a tear strength of, for example, from about 2 Newtons/millimeters to about 4 Newtons/millimeters.

Also disclosed is an article comprised of polyurethane elastomers and foams thereof comprised of and generated from (a) an organic diisocyanate, (b) a polyester resin, (c) a chain extender comprised of a polyhydric alcohol, (d) a crosslinker, (e) a plasticizer, (f) a surfactant, (g) a foaming or blowing agent, (h) a bio-additive, and (i) a colorant like a pigment or a dye; and wherein the elastomer foam has a hardness value of from about 20 Asker C to about 60 Asker C, a tensile strength of from about 1 MPa to about 10 MPa, a resilience of from about 30 percent to about 60 percent, an elongation at break of from about 150 percent to 700 percent, and a tear strength of from about 2 Newtons/millimeters to about 4 Newtons/millimeters.

Moreover, disclosed is a process for the preparation of a polyurethane elastomers and foams thereof comprising mixing the non-reactive components and then adding and reacting the reactive components of (a) an organic diisocyanate, (b) a polyester resin derived from an organic diacid and organic diol, (c) a chain extender comprised of a polyhydric alcohol, (d) a crosslinker, (e) a plasticizer, (f) a surfactant, (g) a bio-additive, (h) a blowing agent, (i) a colorant such as a pigment or a dye, and (j) a catalyst; and wherein said elastomer has a hardness of from about 40 to about 60 Asker C, a tear strength of from about 2 to about 4 Newtons/millimeters, a resilience of from about 25 percent to about 45 percent, and a compression set of from about 3 percent to about 6 percent.

Yet additionally, there is disclosed a polyurethane elastomer and foams thereof prepared from an organic diisocyanate, an amorphous polyester resin, or a semi-crystalline polyester resin with a melting point of equal to, or less than about 50° C., a chain extender comprised of a polyhydric alcohol, a crosslinker, a plasticizer, a dye, a surfactant, a bio-additive, and a foaming or blowing agent; and wherein the elastomer has a hardness of from about 15 to about 60 Asker C, tensile strength of from about 1 to about 10 MPa, and an elongation at break of from about 150 percent to about 700 percent, and which elastomers can be selected for shoe articles comprised of an insole or a midsole.

Yet also disclosed are processes for the preparation of polyurethane elastomers and foams thereof where the active components of a polyester, a crosslinker, a chain extender and a foaming agent are admixed with the non-reactive components of a bio-additive, colorant, plasticizer and surfactant, followed by the addition reaction of an organic polyisocyanate.

Further, in embodiments there are disclosed polyurethane elastomers and foam compositions thereof, and processes thereof, and more specifically, a polyurethane elastomer foam composition that can be selected for the uses disclosed herein including for footwear, such as shoe articles comprised of an insole, a midsole, or both the insole and midsole. More specifically, there is disclosed a polyurethane elastomer foam derived from (a) an organic diisocyanate, (b) an amorphous polyester or semi-crystalline polyester resin derived from an organic diacid and organic diol where the crystalline polyester resin has, for example, a melting point of less than about 55° C. to about 60° C., from about 40° C. to about 50° C., and from about 45° C. to about 49° C., (c) a chain extender comprised of a polyhydric alcohol, (d) a crosslinker, (e) a plasticizer, (f) a surfactant, (g) a bio-additive, (h) a foaming component, such as water; and wherein the elastomer has, for example, a hardness of from about 30 to about 60 Asker C, tensile strength of from about 1 to about 5 MPa, and an elongation at break of from about 250 percent to about 625 percent.

Furthermore, there are disclosed amorphous polyester polyols with melting points of less than about 5° C. to less than about 25° C., and more specifically, an amorphous polyester resin with no or zero melting point, and a glass transition temperature of less than about $-10°$ C., like from about $-2°$ C. to about $-8°$ C. Also, determined, for example, by known techniques like Gel Permeation Chromatography (GPC), other desirable properties for the amorphous polyesters include weight average molecular weights of from about 700 Daltons to about 4,000 Daltons, hydroxyl values of from about 35 to about 65, and an acid number of less than about 5 milligrams/gram of KOH, and more specifically, from about 0.5 to about 1 milligram/gram of KOH. These polyols are subsequently used, for example, to prepare polyurethane foams for the footwear industry and the automobile industry.

There is also disclosed a polyurethane elastomer foam composition comprised of from about 40 to about 55 percent by weight of a polyol polyester, from about 1 to about 3 percent by weight of a chain extender, from about 1 to about 7 percent by weight of a crosslinker, from about 8 to about 15 percent by weight of a plasticizer, from about 0.2 to about 0.5 percent by weight of a surfactant, from about 0.5 percent by weight to about 3 percent by weight of a chain extender, from about 0.1 percent by weight to about 0.5 percent by weight of a catalyst, from about 1 percent by weight to about 5 percent by weight of a bio-additive, from about 0.1 percent by weight to about 3 percent by weight of foaming agent, from about 0.5 percent by weight to about 5 percent by weight of dye, and with from about 10 percent by weight to about 25 percent by weight of an organic diisocyanate where all the percents by weight disclosed are equal to 100 weight percent.

Moreover, there are disclosed processes for the preparation of a polyurethane elastomer foam comprised of contacting a homogenized mixture of from about 40 to about 60 percent by weight or parts of a polyester polyol, from about 8 percent by weight to about 20 percent by weight of a plasticizer, from about 0.5 percent by weight to about 0.5 percent by weight of surfactant, from about 0.5 to about 2 percent by weight of a chain extender, from about 1 percent by weight to about 5 percent by weight of a bio-additive, from about 0.1 percent by weight to about 0.6 percent by weight of an optional catalyst, from about 0.1 percent by weight to about 5 percent by weight of a foaming agent of water, from about 0.1 percent by weight to about 5 percent by weight of crosslinker, from about 0.3 percent by weight to about 5 percent by weight of dye, and with from about 10 percent by weight to about 25 percent by weight of an organic diisocyanate where all the percents by weight disclosed are equal to 100 weight percent.

In addition, the following disclosures are provided:

The disclosed polyurethane elastomer composition foams can be prepared from (i) a first mixture comprised of an amorphous or semi-crystalline polyester polyol resin, plasticizer, surfactant, chain extender, crosslinker, catalyst, water, foaming agent, bio-additive, and colorant; and contacting this first mixture with a diisocyanate.

In one production process embodiment, the disclosed polyurethane elastomer can be prepared using a multistage process comprising soft-segment pre-extension where A) one or more substantially linear polyester diols with functionality of from about 1.8 to about 2.2 are reacted with a portion 1, such as one part of an organic diisocyanate or of the plurality of organic diisocyanatos in a molar NCO/OH ratio of from about 1.1:1 to about 3.5:1, and from about 1.3:1 to about 2.5:1 to provide a relatively high molecular weight isocyanate-terminated prepolymer ("NCO prepolymer"); B) the prepolymer obtained in stage A) is blended with a portion 2 of the organic diisocyanate or the plurality of organic diisocyanatos where the entirety of portion 1 and portion 2 corresponds to the entire amount of diisocyanatos used; C) the mixture obtained in stage B) is reacted with one or more diol chain extenders with, for example, weight average molecular weights, as determined by GPC, of from about 60 to about 350 where the molar NCO:OH ratio resulting from the components used in A), B), and C) is at from about 0.9:1 to about 1.1:1, and where the substantially linear polyester diols A) are comprised of succinic acid and 1,3-propanediol, and have an optional average molar mass of from about 750 to about 3,500 grams/mol. Thereafter, there can be added thereto a bio-additive and other components disclosed herein.

In embodiments, the disclosed polyurethane elastomers, which in embodiments are biodegradable, can be derived from the reaction of a polyester polyol of from about 45 to about 55 percent by weight, a chain extender of from about 0.1 to about 2 percent by weight, a crosslinker of from about 1 to about 5 percent by weight, a foaming agent of from about 0.1 to about 2 percent by weight, and a diisocyanate of from about 40 to about 55 percent by weight, and wherein the total thereof is 100 percent. The surfactant, plasticizer, colorant such as a dye and a bio-additive, can be added to the reaction formed polyurethane elastomer.

Polyurethane elastomers and foams thereof that include at least one of the disclosed bio-additives such as chitin, chitosan, cellulose, Nutmeg, eggshell, hazelnut shell, walnut shell, peanut shell, Brazilian nutshell, pecan shell, cashew nutshell, almond shell, chestnut shell, macadamia nutshell, pistachio nutshell, cellulose, pine nutshell, shells thereof, and mixtures thereof, in embodiments enhance the bio-content of certain elastomers, render them environmentally friendly while simultaneously preserving or improving the mechanical properties of the foams, and which foams may be used in various applications like insoles, midsoles footwear, Yoga mats, seating cushions, and mattresses.

EMBODIMENTS

Polyesters

The disclosed amorphous and semi-crystalline polyester polyol resins can be prepared by a polycondensation process by reacting suitable organic diols and suitable organic diacids in the presence of polycondensation catalysts. Generally, a stoichiometric equimolar ratio of organic diol and organic diacid is utilized, however, an excess of organic diol can be selected such that the resulting polymer displays a hydroxyl number of from about 30 to about 40, an acid number of less than about 5 milligrams/gram of KOH, and more specifically, equal to or less than about 3 milligrams/gram of KOH, and about one milligram of KOH; and with a molecular weight average of from about 1,500 to about 5,000 Daltons as determined by GPC. In some instances, where the boiling point of the organic diol is from, for example, about 180° C. to about 230° C., an excess amount of diol, such as an alkylene glycol like ethylene glycol or propylene glycol of from about 0.2 to 1 mole equivalent, can be utilized and removed during the polycondensation process by distillation. The amount of catalyst utilized varies, and can be selected in amounts as disclosed herein, and more specifically, for example, from about 0.01 percent by weight to about 1 percent by weight, or from about 0.1 to about 0.75 percent by weight based on, for example, the polyester resin.

Examples of organic diacids or diesters selected for the preparation of the amorphous polyester resins and the semi-crystalline polyester resins include fumaric, maleic, oxalic acid, succinic acid, fumaric acid, itaconic acid, glutaric acid, adipic acid, suberic acid, azelaic acid, sebacic acid, 1,12-dodecane dioic acid, C-18 dimer acids, such as 1,16-octadecanedioic acid, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, and diesters or anhydrides thereof. The organic diacid is selected in an amount of, for example, from about 40 percent by weight to about 60 percent by weight and from about 45 to about 55 percent by weight of the polyester resin. The organic diacid selected can also be obtained by fermentation process, natural sources like chemically derived from natural (bio-based) sources, such as succinic acid, fumaric acid, itaconic acid, sebacic acid 1,12-dodecanedioic acid, 2,5-furandicarboxylic acid, azelaic acid, dimer acids, which include aliphatic dimer acids with from about 2 carbon atoms to about 36 carbon atoms, such as C-18 dimer acids, or dimerized fatty acids of dicarboxylic acids prepared by dimerizing unsaturated fatty acids obtained from tall oil, usually on clay catalysts; hydrogenated/saturated dimer acids; and other known suitable organic acids.

The organic diol reactant selected can also be obtained from biomasses generated through fermentation process, natural sources, and chemically derived from natural sources. Examples of organic diols that may be selected include 1,5-pentanediol, 1,2-propanediol(1,2-propylene glycol), 1,3-propanediol, 1,4-butanediol, 1,10-decanediol, 1,9-nonanediol, dimer diols, which include aliphatic dimer diols with from about 2 carbon atoms to about 36 carbon atoms, such as PRIPOL®, and aliphatic diol reactants with, for example, from about 2 carbon atoms to about 36 carbon atoms, include 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 2-ethyl-2-butyl-1,3-propanediol, alkylene glycols like ethylene glycol, propylene glycol, monoethylene glycol, diethylene glycol, monopropylene glycol, dipropylene glycol, isosorbide, mixtures thereof, and the like. The organic diol is selected, for example, in an amount of from 40 percent by weight to about 60 percent by weight, and from about 45 percent by weight to about 55 percent by weight of the polyester.

In embodiments of the present disclosure, examples of specific dimer diols and dimer diacids enabling enhanced hydrophobic characteristics, and thus excellent hydrolytically stable characteristics for the polyesters, include as dimer acids PRIPOL® 1013, PRIPOL® 1017, PRIPOL® 1009, and PRIPOL® 1012, and the dimer diols PRIPOL® 2033, and PRIPOL® 2043.

Examples of semi-crystalline polyesters, amorphous polyesters, and mixtures thereof, and in some instances where the semi-crystalline polyesters can be converted to an amorphous polyester by altering the amount of the comonomers of the amorphous polyester in the reaction mixture, include semi-crystalline polyester resins with, for example, a melting point range of equal to or less than, for example, about 50° C., such as from about 25° C. to about 49° C., or from about 40° C. to about 49° C., and include those resins derived from straight chain aliphatic organic diols, and straight chain aliphatic organic diacids, such as succinic acid, glutaric acid, adipic acid, suberic acid, azelaic acid, sebacic acid, 1,12-dodecane dioic acid, and straight chain aliphatic organic diols, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, and 1,12-dodecanediol, include polyesters containing poly(1,2-ethylene-succinate), poly(1,2-ethylene-adipate), poly(1,2-ethylene-sebacate), poly(1,2-ethylene-decanoate), poly(1,2-ethylene-nonoate), poly(1,2-ethylene-dodeanoate), poly(1,2-ethylene-azeleoate), poly(1,3-propylene-succinate), poly(1,3-propylene-adipate), poly(1,3-propylene-sebacate), poly(1,3-propylene-decanoate), poly(1,3-propylene-nonoate), poly(1,3-propylene-dodeanoate), poly(1,3-propylene-azeleoate), poly(1,4-butylene-succinate), poly(1,4-butylene-adipate), poly(1,4-butylene-sebacate), poly(1,4-butylene-decanoate), poly(1,4-butylene-nonoate), poly(1,4-butylene-dodeanoate), poly(1,4-butylene-azeleoate), poly(1,6-hexylene-succinate), poly(1,6-hexylene-adipate), poly(1,6-hexylene-sebacate), poly(1,6-hexylene-decanoate), poly(1,6-hexylene-nonoate), poly(1,6-hexylene-dodeanoate), poly(1,6-hexylene-azeleoate), poly(1,8-octylene-succinate), poly(1,8-octylene-adipate), poly(1,8-octylene-sebacate), poly(1,8-octylene-decanoate), poly(1,8-octylene-nonoate), poly(1,8-octylene-dodeanoate), poly(1,8-octylene-azeleoate), poly(1,9-nonylene-succinate), poly(1,9-nonylene-adipate), poly(1,9-nonylene-sebacate), poly(1,9-nonylene-decanoate), poly(1,9-nonylene-nonoate), poly(1,9-nonylene-dodeanoate), poly(1,9-nonylene-azeleoate), poly(1,10-decylene-succinate), poly(1,10-decylene-adipate), poly(1,10-decylene-sebacate), poly(1,10-decylene-decanoate), poly(1,10-decylene-nonoate), poly(1,10-decylene-dodeanoate), poly(1,10-decylene-azeleoate), mixtures thereof, other suitable known suitable components, and the like.

The semi-crystalline polyester resins with melting points as disclosed herein, such as from about 40° C. to about 50° C., and from about 45° C. to about 49° C., can be prepared from a mixture of at least one straight chain aliphatic organic diacid, at least one straight chain aliphatic diol, and a branched aliphatic diol, such as 1,2-propanediol, 1,3-butanediol, 2,3-butanediol, 3,3-dimethyl pentanediol, 1,5-pentanediol, mixtures thereof, and the like. The organic diacid of at least one aliphatic straight chain organic diacid is selected in an amount of, for example, from about 45 to about 50 percent by weight of the polyester resin. The straight chain aliphatic diol is selected in an amount of, for example, from about 20 to about 40 percent by weight of the polyester resin, and the branched aliphatic diol is selected in an amount of, for example, from about 20 percent by weight to about 40 percent by weight of the polyester resin. The polyester resins obtained include copoly(1,3-propylene-succinate)-copoly(1,2-proplyene-succinate), copoly(1,4-butylene-succinate)-copoly(1,2-proplyene-succinate), copoly(1,3-propylene-sebacate)-copoly(1,2-proplyene-sebacate), copoly(1,3-propylene-dodecanoate)-copoly(1,2-proplyene-dodecanoate), copoly(1,3-propylene-azeleoate)-copoly(1,2-proplyene-azeleoate), and the like, and mixtures thereof.

Amorphous polyester resin examples selected for the preparation of the polyurethane elastomers usually do not possess a melting point and can have a glass transition temperature of, for example, from about −25° C. to about 10° C., and can be prepared from a mixture of at least one or more straight chain aliphatic diacids, branched aliphatic diols with optionally one or more straight chain aliphatic diols. The straight chain aliphatic diol is selected in an amount of, for example, from about 45 to about 50 percent by weight of the polyester resin, and the branched aliphatic diol is selected in an amount of, for example, from about 30 to about 55 percent by weight of the polyester resin, and optionally one or more straight chain aliphatic diols can be selected in an amount of, for example, from about 0 to about 20 percent by weight of the polyester resin. Examples of the obtained polyester resins include copoly(1,2-propylene-succinate)-copoly(1,2-propylene-sebacate), copoly(1,2-propylene-succinate)-copoly(1,2-proplyene-dodecanoate), copoly(1,2-propylene-sebacate)-copoly(1,2-proplyene-dodecanoate), copoly(1,2-propylene-dodecanoate)-copoly(1,2-proplyene-azeloate), copoly(1,2-propylene-azeleoate)-copoly(1,2-proplyene-succinate), poly(butylene-succinate), poly(butylene-2,5-furanate), poly(butylene-itaconate), poly(propylene-succinate), poly(propylene-2,5-furanate), poly(propylene-itaconate), and the like, and mixtures thereof.

The amorphous polyester, the semi-crystalline polyester, and mixtures thereof can be present in the polyurethane elastomer in various effective amounts of, for example, percent by weight of from about 1 to about 99, from about 10 to about 85, from about 18 to about 75, from about 25 to about 65, from about 30 to about 55, and from about 40 to about 60 based, for example, on the polyurethane elastomer weight.

Plasticizers

Plasticizer examples are tributyl-citrate, CITROFOL® available from Jungbunzlauer, Hallstar IM 8830, an ester available from Hallstar, triethyl-citrate; trimethyl-citrate, adipates such as EDENOL® 650R available from Emery Olechemicals, alkyl benzoates, alkyl phthalates, tributyl citrate, alkyl aryl phthalates, including butyl benzyl phthalate, wherein the alkyl group has a carbon chain of from seven to nine carbon atoms, TEXANOL™, benzyl phthalate, (2,2,4-trimethyl-1,3-pentanediol-monobutyrate benzyl phthalate), alkylphenyl phthalate, symmetrical and unsymmetrical dialkyl phthalates, including diisononyl phthalate, diisodecyl phthalate, dioctyl phthalate, di-n-butyl phthalate, dioctyl phthalate, dihexyl phthalate, diheptyl phthalate, butyloctyl phthalate, linear dialkyl phthalate, wherein the alkyl groups are independently carbon chains having from about seven to about eleven carbon atoms, and butyl cyclohexyl phthalate; phosphate plasticizers, such as tris-(2-chloro-1-methylethyl)phosphate, tris-(alpha-chloroethyl) phosphate (TCEP), tris-(2,3-dichloro-1-propyl)phosphate, YOKE-V6 (tetrakis-(2-chloroethyl) dichloroisopentyl-diphosphate), and the like; phosphate ester plasticizers, such as, for example, 2-ethylhexyl diphenyl phosphate, isodecyl diphenyl phosphate, mixed dodecyl and tetradecyl diphenyl phosphate, trioctyl phosphate, tributyl phosphate, butylphenyl diphenyl phosphate, and isopropylated triphenyl phosphate; and benzoate plasticizers, such as, for example, TEXANOL™ benzoate (which is 2,2,4-trimethyl-1,3-pentanediol-monobutyrate benzoate), glycol benzoate, propylene glycol dibenzoate, dipropylene glycol dibenzoate, and tripropylene glycol dibenzoate, in amounts of, for example, from about 1 percent by weight to about 30 percent by weight, and from about 1 percent by weight to about 15 percent by weight based on the amount of the polyurethane elastomer.

Crosslinkers

The crosslinker is, for example, selected from diethanolamine, glycerol, trimethylol propane, pentaerythritol, 1,2,4-butanetriol, thioglycolic acid, 2,6-dihydroxybenzoic acid, melamine, diglycolamine, 1,2,6-hexanetriol, glycerol, 1,1,1-trimethylolethane, 1,1,1-trimethylolpropane (TMP), triisopropanol amine, triethanol amine, tartaric acid, citric acid, malic acid, trimesic acid, trimellitic acid, trimellitic anhydride, pyromellitic acid, and pyromellitic dianhydride; trimethylolpropane, trimethylolethane; polyethertriols, and glycerol, and especially polyols, such as trimethylolpropane, pentaerythritol, and bio-based materials thereof, present in amounts of, for example, from about 0.1 percent by weight to about 10 percent by weight, and from about 0.1 percent by weight to about 5 percent by weight based on the amount of polyurethane elastomer, and other known suitable crosslinkers.

Chain Extenders

Chain extender examples include alcohols, such as polyhydric alcohols, carboxylic acid derivatives having two functional groups can be selected for the elastomers and processes disclosed herein. More specifically, chain extender examples can contain, for example, two hydroxyl moieties such as 1,2-ethanediol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 2-ethyl-2-butyl 1,3-propanediol; alkylene glycols, like ethylene glycol, propylene glycol, monoethylene glycol, diethylene glycol, monopropylene glycol, dipropylene glycol, mixtures thereof, other known suitable chain extenders, and the like, present in amounts of, for example, from about 0.1 percent by weight to about 10 percent by weight, from about 0.1 percent by weight to about 5 percent by weight based on the polyurethane elastomer, and other known suitable chain extenders.

Bio-Additives

Examples of bio-additives are as illustrated herein, and include chitin, Nutmeg, derived from its seed thereof and mace the seed covering, and chitosan (obtained from Tidal Vision), eggshells (obtained from Lady Gouldian Finch), hazelnut shells (obtained from Grimo Nut Nursery), walnut shells, peanut shells, Brazilian nutshells, pecan shells, cashew nutshells, almond shells, chestnut shells, macadamia nutshells, pistachio nutshells, pine nutshells, cellulose, mixtures thereof, and a bio-additive selected from the group consisting of chitin, chitosan, eggshell, hazelnut shell, walnut shell, peanut shell, Brazilian nutshell, pecan shell, cashew nutshell, almond shell, chestnut shell, macadamia nutshell, pistachio nutshell, pine nutshell, cellulose, and mixtures thereof.

The amount of bio-additives utilized varies, and can be selected in, for example, amounts of from about 0.01 percent by weight to about 10 percent by weight, and from about 0.5 percent by weight to about 5 percent by weight, from about 1 percent by weight to about 4 percent by weight, based for example, on the polyurethane composition amount.

With the presence of at least one bio-additive there results a bio-content, such as for the polyurethane elastomer and foams thereof, of from about 60 percent to about 90 percent, from about 40 percent to 85 percent, from about 70 percent to about 85 percent, and from about 60 percent to about 80 percent.

Shells include shell, mixtures of shells, shell mixtures, mixtures of shells and shell, at least one shell, at least one of shells, suitable known shells, and the like.

Surfactants

The surfactants that can be selected are, for example, polyether-silicone oil mix (TEGOSTAB® B4113) available from Evonik, 8383, silicone surfactant DABCO DC® 193, and TEGOSTAB® B8383 available from Evonik, sodium dodecylbenzene sulfonate, sodium dodecylnaphthalene sulfate, dialkylbenzenealkyl, sulfates and sulfonates, adipic acid, available from Aldrich, NEOGEN R™, NEOGEN SC™, available from Daiichi Kogyo Seiyaku, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol, available from Rhodia as IGEPAL CA-210™, IGEPAL CA-520™, IGEPAL CA-720™, IGEPAL CO-890™, IGEPAL CO-720™, IGEPAL CO-290™, ANTAROX890™, and ANTAROX897™, and other suitable known surfactants in amounts of, for example, from about 0.1 percent by weight to about 10 percent by weight, and from about 0.1 percent by weight to about 3 percent by weight based on the polyurethane elastomer amount.

Catalysts

Polycondensation catalysts utilized for the preparation of crystalline and amorphous polyesters include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, zinc acetate, titanium (iv) isopropoxide (Tyzor TE), tertiary amines, such as triethylamine, dimethylcyclohexylamine, N-methylmorpholine, N,N'-dimethylpiperazine, 2-(dimethylaminoethoxy)ethanol, diazabicyclo[2.2.2]octane, DAPCO 33 LV (33 percent triethylenediamine dissolved in 67 percent dipropylene glycol), BICAT 8109 (bismuth neodecanoate), Jeffcat-Zf-54 (bis-(2-dimethylaminoethyl)ether in dipropylene glycol), KOSMOS® 75 MEG, and the like, organometallic compounds, such as titanic esters, iron compounds, tin compounds, such as tin diacetate, tin dioctoate, tin dilaurate, the dialkyl tin salts of aliphatic carboxylic acids like dibutyltin diacetate and dibutyltin dilaurate, other suitable catalysts, and the like. More specifically, catalysts utilized are comprised of organometallic compounds like titanic esters, iron compounds, tin compounds, and other suitable known catalysts.

In embodiments of the present disclosure, the catalysts selected for the synthesis of the polyester resins, and that are used in the preparation of the polyurethane elastomer foams remain in, or are retained therein, thus purification processes may be avoided for the polyester synthesis, and products thereof, and for the polyurethane elastomer foams.

Colorants

Colorant examples that can be selected, for example, in amounts of from about 1 percent by weight to about 10 percent by weight, 0.1 percent by weight to about 5 percent by weight, and from about 0.1 percent by weight to about 3 percent by weight based on the amount of the polyurethane elastomer, include pigments, dyes, mixtures thereof, and the like. Examples of dyes and pigments include inorganic pigments, such as carbon black, whiteners, such as titanium oxide which has weather resistance, and organic pigments and dyes, such as phthalocyanine blue, azo dyes, Indigo, Congo Red, Methyl Orange, Malachile Green, purple dyes, brown dyes, black dyes, Pigment Blue 15:3 or C.I. Pigment Blue 15:4, phthalocyanine green, quinacridone red, indanthrene orange, and isoindolinone yellow, C.I. Pigment Red 254 and C.I. Pigment Red 122, C.I. Pigment Yellow 151 and C.I. Pigment Yellow 74, Fates Dye and Keen Dye available from BAO Shen Polyurethane Tech.LTD—China, and other suitable known colorants, such as known dyes and pigments illustrated in the Color Index (C.I.), such as known magenta, yellow, and cyan colorants.

Foaming Agents

There is selected as the foaming (or blowing) agent water and other suitable known blowing agents, and which also increases the firmness of the resulting foams. A soft, flexible, plasticized water-blown polyurethane foam composition can be produced from the reaction of a natural polyol and methylene diphenyl diisocyanate, (MDI) or an equivalent isocyanate, and by adding a plasticizer.

Specific examples of foaming agents include water, compressed gases, such as $CO_2$, $N_2$, air or low boiling liquids like cyclopentane, pentane, isobutane and hydrofluorocarbons, added in amounts of from about 0.03 to about 10 percent by weight, and from about 0.5 percent by weight to about 3 percent by weight of the polyurethane elastomer. Also, for example, $CO_2$ may be generated in-situ by the decomposition of $NaHCO_3$ or the reaction of water with isocyanate.

Organic Diisocyanates

Examples of organic diisocyanates selected for the compositions and processes illustrated herein include aliphatic diisocyanates, such as hexamethylene diisocyanate, cycloaliphatic diisocyanates, such as isophorone diisocyanate, cyclohexane 1,4-diisocyanate, 1-methylcyclohexane 2,4-diisocyanate, and 1-methylcyclohexane 2,6-diisocyanate, and the corresponding isomer mixtures, dicyclohexylmethane 4,4'-diisocyanate, dicyclohexylmethane 2,4'-diisocyanate, dicyclohexylmethane 2,2'-diisocyanate, and the corresponding isomer mixtures, aromatic diisocyanates, such as tolylene 2,4-diisocyanate, mixtures of tolylene 2,4-diisocyanate and tolylene 2,6-diisocyanate, diphenylmethane 4,4'-diisocyanate, diphenylmethane 2,4'-diisocyanate, and diphenylmethane 2,2'-diisocyanate, mixtures of diphenylmethane 2,4'-diisocyanate and diphenylmethane 4,4'-diisocyanate, urethane-modified liquid diphenylmethane 4,4'-diisocyanates or diphenylmethane 2,4'-diisocyanates, 4,4'-diisocyanato-1,2-diphenylethane, and naphthylene 1,5-diisocyanate. Especially selected diisocyanates are hexamethylene 1,6-diisocyanate, cyclohexane 1,4-diisocyanate, isophorone diisocyanate, dicyclohexylmethane diisocyanate, diphenylmethane diisocyanates with more than 96 percent by weight content of diphenylmethane 4,4'-diisocyanate, diphenylmethane 4,4'-diisocyanate, and naphthylene 1,5-diisocyanate, suitable known diisocyanates, and mixtures thereof.

In embodiments, there can be selected mixtures of a diisocyanate and a polyisocyanate in an amount of equal to or up to about 15 percent by weight, based on the total diisocyanates present, however, up to or equal to about 40 percent by weight of polyisocyanate can be added, which provides for an improved thermoplastically processable product. Examples of polyisocyanates include triisocyanates, biurets and isocyanurate trimer. In specific embodiments of the present disclosure, there are selected as organic isocyanates triphenylmethane 4,4',4"-triisocyanate, and polyphenylpolymethylene polyisocyanates as well as hexamethylene diisocyanate (HDI) biuret trimer, isocyanurate trimer, and isophorone (IPDI) isocyanurate trimer.

The characteristics and properties of the polyurethane products can be measured as illustrated herein, and by known processes and devices. More specifically, there was selected as a tensile tester the ADMET eXpert 7601 Tensile Tester to measure tensile strength, elongation, tear strength and compression set, by preparing a sample of the polyurethane elastomer, such as a foam material in dog bone shapes with a die cutter with a standard thickness of 10 millimeters and length of 140 millimeters based on ASTM D412, ASTM D3574-17, SATRA TM-2 standards. The sample removed was placed between clamps and where the tensile tester applies the appropriate force at a particular speed (generated by the software) on the test material sample to provide the characteristics, properties and values of the polyurethane products.

Density was measured using the equation Density=Mass/Volume, where mass represents the mass of the material in a mold measured on an analytical balance. Volume of the mold was obtained from the dimensions of the mold. For example, if a mold was producing 10 millimeters, or 1 centimeter polyurethane foam plaques with dimensions length equal to 21 centimeters, width equal to 14.8 centimeters, and the thickness equal to 10 millimeters, then volume was calculated to be 21 times 14.8 times 1 equals 310.80 centimeters$^3$.

The hardness was measured on the Asker C scale, and can also be measured by a durometer.

The bio-content can be determined by various methods. In one method, the bio-content can be measured as follows, and where, for example, the polyester polyol, plasticizer, and chain extender also impart bio-content characteristics to the polyurethane elastomer foams.

Add the total weight of the components/ingredients=X grams;

Add the weight of the components/ingredients that are bio-based, the polyester resin plus the chain extender plus the plasticizer=Y grams;

Total bio-content=(Y/X)×100=the bio-content in percent.

More specifically, for example, when 100 grams of the polyester resin are selected and 5 percent by weight of the bio-additive/filler is added, then based on the polyester resin, the amount of the bio-additive-based filler is 100×0.05=5 grams.

Total weight of ingredients including the bio-filler=Z grams.

Weight of the bio-based ingredients, which also includes the bio-additive-filler=W grams.

New bio-content=(W/Z)×100=N percent, where N represents the new bio-content with biocide additive, or where the bio-content can be partly derived from the polyol polyester, the plasticizer, and the chain extender.

Based on the above disclosed calculation, 1 percent by weight of the bio-additive will increase the bio-content by 0.1 percent; 2.5 percent by weight bio-additive-filler will increase the bio-content by 0.3 percent; 5.0 percent by weight of the bio-additive-filler will increase the bio-content by 0.7 percent; and 10.0 percent of the bio-additive-filler will increase the bio-content by 1.3 percent. Thus, based on the bio-content of the ingredients present in the polyurethane foam formulations, bio-content for the polyurethane elastomer foam is, for example, from about 60 percent to about 90 percent, from about 40 percent to about 85 percent, from about 70 percent to about 85 percent, and from about 60 percent to about 80 percent.

Generally, for the polyurethane plasticizer foam preparation in embodiments and the appropriate Examples that follow, the active reactant components of, for example, the polyester resin, the crosslinker, the chain extender, and the foaming agent, and the non-reactive components of, for example, the bio-additive, colorant, plasticizer, and surfactant, are initially admixed followed by the reaction addition of the organic diisocyanate and heating. Further, the disclosed bio-degradable polyurethane elastomer foams have excellent bio-contents partly originating, for example, from the polyester polyol, the plasticizer, the bio-additive, and the chain extender.

More specifically, although it is not desired to be limited by theory, generally, for the polyurethane plasticizer foam preparation in embodiments and the appropriate Examples that follow the active reactant components of, for example, the polyester resin, the crosslinker, the chain extender, and the foaming agent, and the non-reactive components of, for example, the bio-additive, colorant, plasticizer, and surfactant are initially admixed followed by the addition of the organic diisocyanate and heating. The polyester that contains at least one hydroxyl end group, that is the polyester polyol, reacts with the diisocyanate resulting in a urethane linkage. The chain extender of, for example, 1,3-propanediol which also has hydroxyl ends reacts with the diisocyanate to generate urethane linkages. The crosslinker of, for example, diethanol amine, includes two hydroxyl moieties and one amine (N—H) moiety, and where all three functionalities react with the diisocyanate to form either the urethane or urea linkage, respectively. Finally, the foaming agent like water reacts with the diisocyanate to result in an amine, and that amine further reacts with the diisocyanate to give the urea linkage. The elastomer foam can be referred to as a polyurethane, however, it is known and accepted that when a crosslinker like diethanolamine, and the foam agent like water are present there will be some urea linkages, albeit very small, such as less than about 3.5 percent.

Semi-crystalline refers, for example, to polymers with a highly ordered molecular structure and with sharp melting points. These polymers also have some degree of amorphous regions where the chains are disordered, while the crystalline polymers have a higher degree of long-range order in a polymer material which makes them very rigid with a high melting point.

TEGOSTAB® B4113 and B8383 are considered silicone surfactants; CA-210 is a surfactant of octylphenoxy poly (ethyleneoxy)ethanol; CA-520 is a polyoxyethylene (5) isooctylphenyl ether surfactant; ANTAROX® 890 is an olyoxyethylene (40) nonylphenyl ether surfactant; and ANTAROX® 897 is a poly(oxy-1,2-ethanediyl), α-(nonylphenyl)-ω-hydroxy surfactant.

Polyester polyol PSA300 is a polyester polyol with a weight average molecular weight of about 3,000; ISO is diisocyanate, a commercially available diisocyanate SUPRASEC™ 2379; MDI is diphenyl methane diisocyanate (MDI); and FATES® dye is an orange polyester dye that is commercially. available. The chemical name for FATES® dye has not been disclosed by the supplier. Further examples of dyes are timerland orange, timerland lime green, timerland dark cheddar, all available from BAO Shen Polyurethane Tech.LTD-China; and DABCO® 33LV is an amine catalyst of 33 percent TEDA (triethylene diamine) dissolved in dipropylene glycol. Abrasion refers to a material's ability to withstand wear as it encounters friction.

Specific embodiments of the present disclosure as illustrated in the following Examples, and also the following Examples are not limited to the materials, percentages, conditions, or process parameters set forth in these embodiments. Parts and percentages are by weight unless otherwise indicated. Also, the components can be mixed in various sequences to obtain the polyurethane elastomers and the polyurethane foams, which can be biodegradable. The viscosities were measured by the Brookfield CAP2000 Viscometer. A footbed mold refers to a mold with a cavity of certain design replicating an insole or a midsole of footwear like a shoe. The cavity has a certain volume where the formulation mixture is poured and closed to form the foam product.

EXAMPLES

Examples 1 to 16: General Preparation of Footbed Polyurethane Foams

75 Grams (gm) of a polyester, derived from succinic acid and 1,3-propanediol (available as PS3000 from Panolam Industries), were melted in a 400 milliliters glass can at 70° C. for 2 hours in an oven. To the resulting melted mixture there were added 22.5 grams of tributyl citrate (available from Jungbunzlauer as CITROFOL®), 0.0.413 grams of TEGOSTAB® surfactant (available from Evonik), 2.198 grams of 1,3 propanediol (chain extender), 1.2 grams of DABCO LV® catalyst (available from Evonik), 0.75 grams of water, 2.63 grams of Red dye (available from BAO Shen Polyurethane Tech. LTD-China), and one of the bio-additives as disclosed in Table 1 were then added respectively to the glass can, and the mixture obtained was stirred for 4 minutes at 1,500 rpm to homogenize the mixture and form a dispersion. While stirring, 22.75 grams of a diisocyanate (available from Huntsman as Rubinate 1680) were injected into the dispersion via a pre-weighed syringe. After the syringe was empty, the mixture resulting was stirred for a further 5 seconds and then poured into plaque mold which had a 10-millimeter thickness. The mold temperature was at 50° C. to 55° C. Subsequently, each of the obtained plaques were tested for mechanical properties and bio-contents after cutting them into appropriate dog-bone shapes according to ASTM D3574, and the foam property results are represented in the following Table 1 and Table 2.

TABLE 1

Properties of Polyurethane Foams

| Example | Bio-Additive (weight %) | Density [g/cm3] | Hardness [Asker C] | Tensile Strength [Mpa] | Elongation [%] | Tear Strength [N/mm] | Bio-content [%] |
|---|---|---|---|---|---|---|---|
| 1 | None | 0.32 | 34 | 1.35 | 470.77 | 1.84 | 77 |
| 2 | Eggshell (1%) | 0.32 | 31.75 | 1.53 | 492.37 | 1.61 | 77.2 |

TABLE 1-continued

Properties of Polyurethane Foams

| Example | Bio-Additive (weight %) | Density [g/cm3] | Hardness [Asker C] | Tensile Strength [Mpa] | Elongation [%] | Tear Strength [N/mm] | Bio-content [%] |
|---|---|---|---|---|---|---|---|
| 3 | Eggshell (2.5%) | 0.32 | 31.50 | 1.53 | 476.60 | 1.66 | 77.6 |
| 4 | Eggshell (5%) | 0.32 | 31.25 | 1.4 | 460.17 | 1.64 | 78.2 |
| 5 | Chitin (1%) | 0.32 | 29.25 | 1.47 | 459.52 | 1.80 | 77.2 |
| 6 | Chitin (2.5%) | 0.32 | 32.50 | 1.21 | 345.22 | 1.68 | 77.4 |
| 7 | Chitin (5%) | 0.32 | 34.50 | 1.28 | 335.84 | 1.78 | 78.1 |
| 8 | Chitosan (1%) | 0.193 | 15.4 | 0.39 | 327 | 1.162 | 77.2 |
| 9 | Chitosan (2.5%) | 0.229 | 15.2 | 0.29 | 261 | 1.383 | 77.6 |
| 10 | Chitosan (5%) | 0.216 | 15.5 | 0.26 | 191 | 1.565 | 78.2 |
| 11 | Hazelnut shell (1%) | 0.32 | 34.50 | 1.58 | 439.26 | 1.58 | 77.2 |
| 12 | Hazelnut shell (2.5%) | 0.32 | 34.00 | 1.54 | 436.77 | 1.56 | 77.6 |
| 13 | Hazelnut shell (5%) | 0.32 | 36.00 | 1.27 | 340.63 | 1.55 | 78.2 |
| 14 | Cellulose (1%) | 0.32 | 31 | 1.63 | 464.83 | 1.66 | 76 |
| 15 | Cellulose (2.5%) | 0.32 | 31.75 | 1.29 | 346.52 | 1.62 | 77 |
| 16 | Cellulose (5%) | 0.32 | 35.25 | 1.41 | 388.55 | 1.68 | 77.2 |

TABLE 2

The properties of conditioned polyurethane plaques kept at room temperature, about 25° C., and at about 50 percent, plus or minus, relative humidity for at least one hour, as a function of various natural bio-additives.

| Example | Bio-Additive (weight %) | Density [g/cm3] | Tensile Strength [Mpa] After Conditioning | Elongation [%] After Conditioning |
|---|---|---|---|---|
| 1 | None | 0.32 | 1.15 | 404.37 |
| 2 | Eggshell (1%) | 0.32 | 1.39 | 436.80 |
| 3 | Eggshell (2.5%) | 0.32 | 1.29 | 411.28 |
| 4 | Eggshell (5%) | 0.32 | 1.16 | 367.61 |
| 5 | Chitin (1%) | 0.32 | 1.14 | 348.92 |
| 6 | Chitin (2.5%) | 0.32 | 0.93 | 326.70 |
| 7 | Chitin (5%) | 0.32 | 1.01 | 269.10 |
| 8 | Chitosan (1%) | 0.13 | 0.20 | 401.2 |
| 9 | Chitosan (2.5%) | 0.12 | .25 | 392.72 |
| 10 | Chitosan (5%) | 0.11 | .25 | 423.11 |
| 11 | Hazelnut shell (1%) | 0.32 | 1.31 | 409.06 |
| 12 | Hazelnut shell (2.5%) | 0.32 | 1.29 | 424.66 |
| 13 | Hazelnut shell (5%) | 0.32 | 1.16 | 433.71 |
| 14 | Cellulose (1%) | 0.32 | 1.21 | 435.40 |
| 15 | Cellulose (2.5%) | 0.32 | 1.07 | 301.21 |
| 16 | Cellulose (5%) | 0.32 | 1.27 | 353.00 |

Example 17

Preparation of the semi-crystalline polyester resin, derived from succinic acid, 1,12-dodecanedioic acid, 1,3-propanediol, 1,2-propanediol, and wherein the molar ratio of 1,3-propanediol to 1,2-propanediol is 3, and the molar ratio of succinic acid to 1,12-dodecanedioic acid was 1.

To a 300 milliliter three necked round bottom flask equipped with a mechanical stirrer were added 77.5 grams of succinic acid, 151.1 grams of 1,12-dodecanedioic acid, 115 grams of 1,3-propanediol, 15 grams of 1,2-propanediol, and 0.1 gram of titanium (iv) isopropoxide (Tyzor TE) catalyst. The reaction mixture was kept under constant nitrogen flow of about 5 standard cubic feet per minute (scfm) and heated to 140° C. over 30 minutes. The mixture obtained was then stirred at 200 rpm, and the temperature was increased by 10° C. every 15 minutes until the temperature reached 200° C. Samples of the resin, about 2 grams, each were taken every 20 minutes using a glass pipette, and when a viscosity of about 4310 centipoises was obtained, the resin mixture was discharged into a metal pan. The acid value obtained for the resulting semi-crystalline polyester was 2.54 milligrams/gram of KOH, and the melting point for this resin was determined to be 37.8° C. as measured by DSC.

Example 18

Preparation of the semi-crystalline polyester resin, derived from succinic acid, sebacic acid, 1,3-propanediol, 1,2-propanediol; and wherein the molar ratio of 1,3-propanediol to 1,2-propanediol is 7.67, and the molar ratio of succinic acid to sebacic acid is 1.

To a 300 milliliter three necked round bottom flask equipped with a mechanical stirrer are added 77.5 grams of succinic acid, 132.7 grams of sebacic acid (bio-based), 115 grams of 1,3-propanediol, 15 grams of 1,2-propanediol, and 0.1 gram of titanium (iv) isopropoxide (Tyzor TE) catalyst. The reaction mixture resulting is kept under constant nitrogen flow of about 5 standard cubic feet per minute (scfm) and is heated to 140° C. over 30 minutes. The mixture is then stirred at 200 rpm, and the temperature is increased by 10° C. every 15 minutes until a temperature of 200° C. is reached. Samples of the resin, about 2 grams, each are then taken every 20 minutes with a glass pipette, and when a viscosity of about 4300 centipoise is obtained, the resin mixture is discharged into a metal pan. Substantially similar results as illustrated in Example 17 are obtainable for Example 18.

Example 19

Preparation of a semi-crystalline polyester resin derived from succinic acid, octadecane-dioc-acid, 1,3-propanediol, 1,2-propanediol; and wherein the molar ratio of 1,3-propanediol to 1,2-propanediol is 7.67, and the molar ratio of succinic acid to octadecane-dioc-acid is 1.

To a 500 milliliter three necked round bottom flask equipped with a mechanical stirrer were added 77.5 grams of succinic acid, 206.4 grams of octadecane-dioc-acid (available as C-18 Dimer Diacid from Elevance), 115 grams of 1,3-propanediol, 15 grams of 1,2-propanediol, and 0.1 gram of titanium (iv) isopropoxide (Tyzor TE) catalyst. The reaction mixture resulting was kept under constant nitrogen flow of about 5 standard cubic feet per minute (scfm) and heated to 140° C. over 30 minutes. The mixture obtained was then stirred at 200 rpm, and the temperature was increased by 10° C. every 15 minutes until the temperature reached 200° C. Samples of the resin, about 2 grams each, were taken every 20 minutes using a glass pipette, and when a viscosity of about 4110 centipoises was obtained, the resin mixture was discharged into a metal pan. The acid value obtained for the resulting semi-crystalline polyester resin was 1.07 milligram/gram of KOH, and the melting point of this semi-crystalline polyester resin was determined by DSC to be 61.6° C.

Example 20

Preparation of an amorphous polyester resin derived from succinic acid, dilinoleic diol (DLA-OH), 1,3-propanediol, and 1,2-propanediol.

To a 500 milliliter three necked round bottom flask equipped with a mechanical stirrer were added 65.88 grams of succinic acid, 78.05 grams of dilinoleic diol (available as C-35 PRIPOL® 2033 Dimer Diol available from Croda Industrial Chemicals), 55.31 grams of 1,3-propanediol, 55.31 grams of 1,2-propanediol, and 0.146 gram of titanium (iv) isopropoxide (Tyzor TE) catalyst. The resulting reaction mixture was kept under constant nitrogen flow of about 5 standard cubic feet per minute (scfm) and heated to 155° C. over 30 minutes. The mixture obtained was then stirred at 200 rpm, and the temperature was increased by 10° C. every 15 minutes until the temperature reached 195° C. Samples of the resin, about 2 grams each, were then taken every 20 minutes using a glass pipette, and when a viscosity of about 4480 centipoises was obtained, the resin mixture was discharged into a metal pan. The polyester polyol was obtained as a clear transparent viscous liquid that flowed upon cooling to ambient temperature. The acid value obtained for the generated product was 0.5 milligram/gram of KOH, and there was no measured melting point for the amorphous polyester obtained.

Example 21

Preparation of the semi-polyester resin, poly(1,3-propylene-succinate), generated from 1,3-propanediol and succinic acid with a resin melting point of 49.3° C., determined as disclosed herein.

To a 300 milliliter three necked round bottom flask equipped with a mechanical stirrer were added 169 grams of succinic acid, 137 grams of 1,3-propanediol, and 0.1 gram of titanium (iv) isopropoxide (Tyzor TE) catalyst. The reaction mixture was kept under constant nitrogen flow of about 5 standard cubic feet per minute (scfm) and heated to 140° C. over 30 minutes. The mixture resulting was then stirred at 200 rpm, and the temperature was increased by 10° C. every 15 minutes until the temperature reached 200° C. Samples, about 2 grams each, were removed every 20 minutes using a glass pipette, and when a viscosity of about 5180 centipoise was obtained, as measured by the Brookfield CAP2000 Viscometer at 80° C. and a spindle rate of 100 rpm, the resin mixture was discharged onto a metal pan. The acid value of the obtained resin was 1.09 milligram/gram of KOH, measured by dissolving a sample in tetrahydrofuran containing phenolphthalein indicator, and subsequently titrating with a 0.1 N potassium hydroxide solution in ethanol. The melting point of this resin was determined to be 49.3° C., using a DuPont 910 Differential Scanning Calorimetry (DSC), with a heating rate of 20° C./minute on the second scan and taking the peak value of the melting point transition curve.

Example 22

Preparation of the semi-crystalline polyester resin, poly (1,3-propylene-succinate) with a melting point of 49.1° C. as measured by DSC, was prepared from 1,3-propanediol and succinic acid.

To a 300 milliliter three necked round bottom flask equipped with a mechanical stirrer, were added 155 grams of succinic acid, 130 grams of 1,3-propanediol, and 0.1 gram of titanium (iv) isopropoxide (Tyzor TE) catalyst. The reaction mixture was kept under constant nitrogen flow of about 5 standard cubic feet per minute (scfm) and heated to 140° C. over 30 minutes. The obtained mixture was then stirred at 200 rpm, and the temperature was increased by 10° C. every 15 minutes until the temperature reached 200° C. Samples of the resin, about 2 grams, were taken every 20 minutes using a glass pipette, and when a viscosity of about 3750 centipoises was obtained, the resin mixture was discharged into a metal pan. The acid value of the obtained polyester was 0.93 milligram/gram of KOH.

Example 23

Preparation of a semi-crystalline polyester resin, copoly (1,3-propylene-succinate)-copoly(1,2-propylene-succinate), from succinic acid, 1,3-propanediol, 1,2-propanediol; and wherein the molar ratio of 1,3-propanediol to 1,2-propanediol was 7.67.

To a 300 milliliter three necked round bottom flask equipped with a mechanical stirrer were added 155 grams of succinic acid, 115 grams of 1,3-propanediol, 15 grams of 1,2-propanediol and 0.1 gram of titanium (iv) isopropoxide (Tyzor TE) catalyst. The reaction mixture was kept under constant nitrogen flow of about 5 standard cubic feet per minute (scfm) and heated to 140° C. over 30 minutes. The mixture was then stirred at 200 rpm, and the temperature was increased by 10° C. every 15 minutes until the temperature reached 200° C. Samples of the resin were then taken with a glass pipette every 20 minutes, and when a viscosity of about 3735 centipoise was obtained, the resin mixture was discharged into a metal pan. The acid value of the semi-crystalline polyester obtained was 1.88 milligrams/ gram of KOH, and the melting point thereof of this resin was determined to be 43.9° C. by DSC.

Example 24

Plaques of PU, Polyurethane Elastomer Foams for Insoles

The plaque of foam prepared in accordance with Example 1, thickness 10 millimeters (mold volume, 311 cm$^3$) was first conditioned by preheating it at 50° C. to 55° C. for 2 hours to ensure equal distribution of the temperature. The mold was then opened, and a mold release agent was lightly brushed along the lower and upper part of the mold resulting in the development of a shiny waxy consistency.

Sixty (60) grams of the polyester of Example 17, and 15 grams of the polyester polyol PSA300, a polyester polyol with an average molecular weight of about 3000, were melted in a 400 milliliter glass can at 70° C. for 2 hours inside an oven. To this were added 22.5 grams of tributyl citrate (available from Jungbunzlauer as CITROFOL®), 0.0.413 gram of TEGOSTAB® surfactant (available from Evonik), 2.5 percent by weight of the bio-additive of egg shells, a bio-additive of chitin, 2.5 percent by weight, or chilosan, 5 percent by weight, 2.198 grams of 1,3-propanediol, 1.2 grams of DABCO LV® catalyst (available from Evonik), 0.75 gram of water, 2.63 grams of FATE® dye (available from BAO Shen Polyurethane Tech.LTD-China), 0.225 gram of diethanolamine, and 1.5 gram of carbodiimide (available from Stahl as PICASSIAN® XL-725). The mixture resulting was then stirred for 4 minutes at 1500 rpm using a homogenizer. To the obtained product, and while homogenizing, 19 milliliters of MDI diisocyanate (available from Huntsman as SUPRASEC™ 2379) were added using a syringe, and the mixture obtained was further homogenized for 5 seconds. The resulting mixture containing the eggshells was then poured into the above shiny waxy mold, which was then closed shut and allowed to cure at a temperature of from about 50° C. to 55° C. The demold time was 15 to 20 minutes after which the mold was opened, and the foam plaque was removed and placed on a flat surface. The plaque was cut into appropriate dog-bone shapes for mechanical testing. The density and hardness were then tested according to the procedures illustrated herein, resulting in a density of 0.32 gram/centimeter$^3$, a hardness of 30, a tensile strength of 1.2 MPa, an elongation of 420 percent, a tear strength of 2.2 Newtons/millimeters, and a resilience of 37 percent.

Example 25

Preparation of Midsoles Comprised of Polyurethane Elastomers

A plaque mold, thickness 10 millimeters (mold volume, 311 centimeters$^3$), was first conditioned by preheating at about 50° C. to 55° C. for 2 hours to ensure equal distribution of the temperature. The mold was opened, and a mold release agent was lightly brushed along the lower and upper part of the mold which resulted in a shiny waxy consistency.

Seventy-two (72) grams of Polyol PSA 3000 and 8 grams of polyol PSA 2000 blend (available from Bioamber) were melted in a 400 milliliter glass can at 70° C. for 2 hours in an oven. To this were added 24 grams of plasticizer (available from Jungbunzlauer as CITROFOL®), 0.44 gram of TEGOSTAB® surfactant (available from Evonik), 4 grams of 1,3-propanediol chain extender, 0.24 gram of DABCO LV® catalyst (available from Evonik), 0.16 gram of water, 4 grams of polysaccharide (available as NULVOLVE® from DuPont), and the eggshells bio-additive of Example 24 were added to the can, and the mixture obtained stirred for 4 minutes at 1500 rpm to homogenize. While stirring, there was injected into the resulting mixture the diisocyanate ISO MM103, 33.55 milliliters, via pre-weighed syringe. Once the syringe was empty, the obtained mixture was stirred for a further 5 seconds to homogenize. The mixture obtained was then poured into the above shiny waxy mold, which was closed shut and allowed to cure at the mold temperature. The demold time was 15 to 20 minutes after which the mold was opened, and the foam plaque was removed and placed on a flat surface. The plaques resulting were cut into appropriate dog-bone shapes for mechanical testing with the following results: density of 0.4333 gram/centimeters$^3$, tensile strength of 2.12 MPa, elongation of 409 percent, tear strength of 3.10 Newtons/millimeters, and a resilience of 42 percent.

Example 26

Preparation of the Polyurethane Elastomer for Midsoles

A plaque mold, thickness 10 millimeters (mold volume, 311 centimeters$^3$), was first conditioned by preheating at about 50° C. to 55° C. for 2 hours to ensure the equal distribution of the temperature. The mold was then opened and a mold release agent was lightly brushed along the lower and upper part of the mold resulting in a shiny waxy consistency. Polyol PSA 3000, 81.45 grams, and 9.05 grams of polyol PSA 2000 blend were melted in a 400-milliliter glass can at 70° C. for 2 hours in an oven. The ingredients of the above Example 25 at amounts of 27.15 grams plasticizer, 0.50 gram surfactant, 4.53 grams of chain extender, 0.18 gram of catalyst, 0.14 gram of water, 2.5 weight percent of the bio-additive chilosan and 4.53 grams of polysaccharide were added to the can, and the mixture obtained stirred for 4 minutes at 1500 rpm to homogenize. While stirring, there was then injected into the resulting mixture ISO MM103, 37.07 milliliters, by a pre-weighed syringe. Once the syringe was empty, the mixture present was stirred for a further 5 seconds to homogenize. Then, the mixture was poured into a mold which was closed shut and allowed to cure at the mold temperature. The demold time was 15 to 20 minutes after which the mold was opened, and the foam plaque was removed and placed on a flat surface. The plaque was cut into appropriate dog-bone shapes for mechanical testing. The properties, such as the density, were tested according to the procedures illustrated herein with the following results: density of 0.433 gram/centimeter$^3$, tensile strength of 1.87 MPa, elongation of 395 percent, tear strength of 2.52 Newtons/millimeters, and a resilience of 42 percent.

Example 27

Preparation of an amorphous polyester resin derived from succinic acid, octadecane-dioc-acid (dimer acid), 1,3-propanediol, 1,2-propanediol; and wherein the molar ratio of 1,3-propanediol to 1,2-propanediol is 1, and the molar ratio of succinic acid to the dimer acid is 1.

To a 500 milliliter three-necked round bottom flask equipped with a mechanical stirrer were added 77.5 grams of succinic acid, 206.4 grams of octadecane-dioc-acid (available as C-18 dimer diacid from Elevance), 60 grams of 1,3-propanediol, 60 grams of 1,2-propanediol, and 0.1 gram of titanium (iv) isopropoxide (Tyzor TE) catalyst. The reaction mixture obtained was kept under constant nitrogen flow of about 5 standard cubic feet per minute (scfm) and heated to 140° C. over 30 minutes. The mixture was then stirred at 200 rpm, and the temperature was increased by 10°

C. every 15 minutes until the temperature reached 200° C. Samples of the resin, about 2 grams each, were then taken every 20 minutes using a glass pipette, and when a viscosity of about 4110 centipoises was obtained, the resin mixture was discharged into a metal pan. The acid value obtained for the generated amorphous polyester resin was 1.07 milligrams/gram of KOH. There was no melting point transition indicated by DSC for the obtained amorphous polyester.

The claims, as originally presented and as they may be amended, encompass variations, alternatives, modifications, improvements, equivalents, and substantial equivalents of the embodiments and teachings disclosed herein, including those that are presently unforeseen, or unappreciated, and that, for example, may arise from applicants/patentees and others. Unless specifically recited in a claim, steps, or components of claims should not be implied, or imported from the specification, or any other claims as to any particular order, number, position, size, shape, angle, color, or material. Percent by weight is a known quantity and is usually based on the total of the components present, divided by the scum involved component; molecular weights were determined as illustrated herein or provided by the sources involved; and from about to about includes all the values in between and some values that exceed or may not exceed the values disclosed.

What is claimed is:

1. A polyurethane elastomer derived from at least (a) an organic diisocyanate, (b) a polyester, (c) a chain extender, (d) a crosslinker, (e) a plasticizer, (f) a surfactant, (g) a foaming agent, and (h) a bio-additive comprising eggshell, wherein said polyester comprises one or more of: poly(1,2-ethylene-succinate), poly(1,3-propylene-succinate), and copoly(1,3-propylene-succinate)-copoly(1,2-propylene-succinate), wherein the elastomer has a hardness value of from about 15 Asker C to about 60 Asker C, a tensile strength of from about 1 MPa to about 10 MPa, a resilience of from about 25 percent to about 60 percent, an elongation at break of from about 150 percent to 700 percent, and a tear strength of from about 2 Newtons/millimeters to about 4 Newtons/millimeters.

2. A polyurethane elastomer in accordance with claim 1 wherein said-bio-additive further comprises one or more of hazelnut shells, walnut shells, peanut shells, Brazilian nutshells, pecan shells, cashew nutshells, almond shells, chestnut shells, macadamia nutshells, pistachio nutshells, pine nutshells, and mixtures thereof.

3. A polyurethane elastomer in accordance with claim 1 wherein said bio-additive consists of eggshell.

4. A polyurethane elastomer in accordance with claim 1 wherein the bio-content of the polyurethane elastomer is from about 60 wt. % to about 90 wt. %, and where said elastomer further includes a colorant.

5. A polyurethane elastomer in accordance with claim 4, wherein said colorant is comprised of a dye or a pigment, and is present in an amount of from about 0.5 wt. % to about 5 wt. %, wherein said foaming agent is carbon dioxide or water, wherein said polyester is a semi-crystalline polyester of either poly(1,3-propylene-succinate) or copoly(1,3-propylene-succinate)-copoly(1,2-propylene-succinate) and has a melting point of from about 40° C. to about 50° C.

6. A polyurethane elastomer in accordance with claim 1 further including a colorant selected from the group consisting of a dye, a pigment and mixtures thereof.

7. A polyurethane elastomer in accordance with claim 1 wherein the bio-content of the polyurethane elastomer is from about 70 wt. % to about 85 wt.

8. A polyurethane elastomer in accordance with claim 1 wherein said elastomer has a density of from about 0.25 gram/centimeters$^3$ to about 0.55 gram/centimeters$^3$, wherein the bio-content of the polyurethane elastomer is from about 70 wt. % to about 90 wt. %, and has a compression set of from about 3 percent to about 6 percent.

9. A polyurethane elastomer in accordance with claim 1 wherein said polyester is generated from the reaction of organic diacid and an organic diol, wherein said organic diacid is succinic acid, and said organic diol is selected from the group consisting of ethylene glycol, 1,3-propanediol, and 1,2-propanediol, and wherein said organic diol and said organic diacid are obtained from natural carbohydrates, biobased carbohydrates, or from the fermentation of carbohydrates.

10. A polyurethane elastomer in accordance with claim 1 wherein said organic diisocyanate is selected from the group consisting of diphenylmethane 4,4'-diisocyanate, isophorone diisocyanate, dicyclohexylmethane 4,4-diisocyanate, hexamethylene 1,6-diisocyanate, naphthalene 1,5-diisocyanate, and mixtures thereof.

11. A polyurethane elastomer in accordance with claim 1 wherein said organic diisocyanate is methylenediphenyl diisocyanate.

12. A polyurethane elastomer in accordance with claim 1 wherein said plasticizer is selected from the group consisting of tributyl-citrate, an ester, triethyl-citrate; trimethyl-citrate, an adipate, alkyl aryl phthalates, alkyl benzoates, and alkyl phthalates.

13. A polyurethane elastomer in accordance with claim 1 wherein said surfactant is selected from the group consisting of a polyether-silicone oil, a silicone surfactant, sodium dodecylbenzene sulfonate, sodium dodecylnaphthalene sulfate, adipic acid, polyvinyl alcohol, polyacrylic acid, methalose, methyl cellulose, and ethyl cellulose.

14. A polyurethane elastomer in accordance with claim 1 wherein said chain extender is selected from the group consisting of alkylene diols and alkylene glycols, and wherein said elastomer further includes a catalyst.

15. A polyurethane elastomer in accordance with claim 1 wherein said crosslinker is selected from the group consisting of diethanolamine, glycerol, trimethylol propane, pentaerythritol, 1,2,4-butanetriol, thioglycolic acid, 2,6-dihydroxybenzoic acid, melamine, and mixtures thereof.

16. A polyurethane elastomer in accordance with claim 1 further including a pigment or dye colorant present in an amount of from about 0.5 wt. % to about 5 wt. %.

17. A polyurethane elastomer derived from at least (a) an organic diisocyanate, (b) a polyester, (c) a chain extender, (d) a crosslinker, (e) a plasticizer, (f) a surfactant, (g) a foaming agent, and (h) a bio-additive comprising eggshell, wherein said polyester comprises one or more of: poly(1,2-ethylene-succinate), poly(1,3-propylene-succinate), and copoly(1,3-propylene-succinate)-copoly(1,2-propylene-succinate); wherein said elastomer has a hydrolytic stability of from about 80 percent to about 150 percent, a resilience of from about 35 percent to about 45 percent, and a compression set of from about 3 percent to about 6 percent.

18. A polyurethane elastomer in accordance with claim 17, wherein said plasticizer is tributyl citrate, said crosslinker is an amine, said chain extender is a propanediol, and said foaming agent is water or carbon dioxide.

19. An article of manufacture comprising a polyurethane elastomer derived from at least (a) an organic diisocyanate, (b) a polyester, (c) a chain extender, (d) a crosslinker, (e) a plasticizer, (f) a surfactant, (g) a foaming component, (h) a bio-additive additive comprising eggshell, and (i) a colorant, wherein said polyester comprises one or more of: poly(1,2-ethylene-succinate), poly(1,3-propylene-succinate), and copoly(1,3-propylene-succinate)-copoly(1,2-propylene-succinate); and wherein said elastomer has a hardness value of from about 15 Asker C to about 60 Asker C, a tensile strength of from about 1 MPa to about 10 MPa, a resilience of from about 25 percent to about 60 percent, an elongation at break of from about 150 percent to about 700 percent, and a tear strength of from about 2 Newtons/millimeters to about 4 Newtons/millimeters.

20. An article in accordance with claim 19, wherein the bio-content of the polyurethane elastomer is from about 60 wt. % to about 90 wt. %, and wherein said colorant is a dye.

21. An article in accordance with claim 19, wherein the article is an insole or a midsole.

22. An insole or a midsole comprising the polyurethane elastomer of claim 8.

\* \* \* \* \*